United States Patent [19]

Boehmer et al.

[11] Patent Number: 5,272,181
[45] Date of Patent: Dec. 21, 1993

[54] BIODEGRADABLE EXPANDED FOAM MATERIAL

[75] Inventors: Edward W. Boehmer, Bloomington; Daniel L. Hanlon, Burnsville, both of Minn.

[73] Assignee: EverGreen Solutions, Inc., Minneapolis, Minn.

[21] Appl. No.: 978,112

[22] Filed: Nov. 18, 1992

[51] Int. Cl.$^5$ .............................. C08J 9/12
[52] U.S. Cl. .................... 521/84.1; 106/122; 521/109.1; 521/149; 527/313
[58] Field of Search ............ 521/84.1, 109.1, 149, 521/313; 106/122

[56] References Cited

U.S. PATENT DOCUMENTS

| | | | |
|---|---|---|---|
| 3,138,564 | 6/1964 | Borunsky et al. | 260/17 |
| 3,981,100 | 9/1976 | Weaver et al. | 47/58 |
| 3,985,616 | 9/1975 | Weaver et al. | 195/63 |
| 3,997,484 | 12/1976 | Weaver et al. | 260/17.4 |
| 4,026,849 | 5/1977 | Bagley et al. | 260/17.4 |
| 4,282,121 | 8/1981 | Goodrich . | |
| 4,863,655 | 9/1989 | LaCourse et al. | 521/84.1 |
| 4,931,488 | 6/1990 | Chiquet . | |
| 5,035,930 | 7/1991 | LaCourse et al. | 521/84.1 |
| 5,043,196 | 8/1991 | LaCourse et al. | 521/84.1 |

FOREIGN PATENT DOCUMENTS 0118240 12/1984 European Pat. Off. .
1485833 9/1977 United Kingdom .

*Primary Examiner*—Morton Foelak
*Attorney, Agent, or Firm*—Moore & Hansen

[57] ABSTRACT

Expanded foam materials having a high degree of biodegradability are prepared by combining a starch-graft copolymer (SGC) with grain based starch containing materials and 15-25% water and expanding the mixture either with or without blowing agents. The mixture of SGC and grain based material is directly expanded at elevated temperature with an extruder or other expansion means. The product may be customized for particular applications by manipulating the particular grafted monomer, manipulating the ratio of SGC to grain based material and/or by the addition of nucleators, blowing agents, plasticizers or other additives, and/or by varying moisture content and the conditions of expansion.

6 Claims, No Drawings

BIODEGRADABLE EXPANDED FOAM MATERIAL

BACKGROUND OF THE INVENTION

This invention relates generally to foam materials. More particularly, this invention pertains to expanded polymeric foam materials which include plant-based materials to enhance biodegradability.

Expanded foam materials, such as friable cereals, have been produced for many years within the food industry. Recently, this technology has been applied to lightweight resilient packaging materials utilizing grain based ingredients. In U.S. Pat. No. 4,282,121, for example, a starch-hydrolyzed polyacrylonitrile graft copolymer was dispersed in a polyhydric alcohol such as glycerol to form a resilient rubbery material. The degree of expansion was disclosed to be relatively small, i.e. 10-20 percent, indicating a relatively heavy foam material.

Expanded foam technology has been used in the plastics industry, particularly for manufacturing foamed packing materials with a twin-screw extruder. Use of single screw extruders has not been contemplated in such applications because of difficulties in achieving and controlling the desired degree of integral mixing and comminution.

Single-screw extruders pressurize and melt the materials by passage thereof between the threads of a single screw. In a twin-screw extruder, the two screws are overlapping to provide a higher degree of internal mixing and higher shear forces. Twin-screw extruders provide additional degrees of freedom in process control, and their use is dictated in other expansion processes.

British Patent Specification No. 1.485.833 has disclosed that plastics with carbon-carbon bonds can be rendered biodegradable by an addition of (a) starch or chemically modified starch and (b) an oxidizable substance such as a fatty acid and/or a fatty acid ester. The process has been found to be dependent upon transition metal content of the soil, and thus not generally applicable. The formation of starch-graft copolymers is not in view.

U.S. Pat. No. 4,931,488 of Chiquet discloses a method for enhancing the biodegradability of plastics by adding to the plastic (a) a biodegradable substance such as starch, (b) an iron compound, and (c) a fatty acid or fatty acid ester. Starch-graft copolymers are not in view, and the application to foamed products is not mentioned.

The grafting of saponified polyacrylonitrile to gelatinized starch is known, for example in U.S. Pat. Nos. 3,981,100, 3,985,616 and 3,997,484 of Weaver et al., resulting in products of very high water absorptive capabilities. The starch-graft polymers formed contain 60-90% acrylonitrile resin.

U.S. Pat. No. 3,138,564 of Borunsky et al. teaches that monomers such as acrylonitrile may be grafted to an oxidized or ozonized-oxidized starch.

EPO Patent Publication No. 0 118 240 of Wittwer et al. discloses the "destructurizing" of starch by treatment at supra-melting temperatures and low shear pressures in the presence of water. The starch structure is changed to form a gel under these mild conditions, improving its use in mold-forming gel capsules therefrom.

U.S. Pat. No. 4,026,849 of Bagley et al. discloses a method for producing a biodegradable filled composite plastic by grafting a high percentage, i.e. 40-60%, of a thermoplastic monomer onto starch. The product exhibited little or no die swell and could be extruded at low moisture content to make a strong insoluble plastic of good quality. Starch-graft copolymers prepared in accordance with the method disclosed by Bagley et al. are produced under conditions of higher temperature, i.e. more severe than disclosed in the Wittwer et al. patent, and are useful in the practice of the present invention. The use of the starch-graft copolymer in expanded products is not in view in the Bagley et al. patent.

Much effort has been expended to find biodegradable polymer containing materials. It has been found that many so-called biodegradable materials are biodegradable over time under laboratory conditions, but remain undegraded for long periods in the natural environment. A major reason for this phenomenon is because the articles do not rapidly disintegrate into small particles which become integrated with a soil layer containing the required constituents for disintegration, e.g. moisture, microorganisms, and growth components such as ammonia nitrogen.

Another reason is that the disintegration of some "biodegradable" materials is dependent upon solar radiation. Burial in a landfill effectively cuts off exposure to the sun, inhibiting degradation.

BRIEF SUMMARY OF THE INVENTION

The present invention comprises a formulation for producing biodegradable foamed articles.

The invention also comprises expanded foam articles including packing materials and the like produced from the formulations of the invention.

The invention also comprises a method for preparing a formulation useful in the production of expanded foam articles.

In addition, the present invention comprises a process for preparing biodegradable foamed polymeric materials and articles from the formulations of the invention.

A wide variety of foamed products, with significant differences in properties, is encompassed by the invention.

For example, in one embodiment of the invention, a foamed polymeric article may be produced which retains its shape and compressibility under non-wetted conditions but disintegrates to a pulverous amorphous mass when subjected to a continuous liquid water phase. The material is thus rapidly integrated into the upper soil layer if discarded upon soil or if placed in a subsurface layer of a landfill. In addition, the material may be disposed of in a wastewater treatment system having facilities for biological or other types of degradative treatment.

In other embodiments of the invention, foamed products may be formed which are more stable for semi-permanent use, yet retaining a high degree of biodegradability upon disposal.

In accordance with the invention, an expandable foam formulation is prepared having the following formulation:

A. about 5 to 100 parts(dry basis) of a starch-graft copolymer (SGC) formed by heavily, i.e. 15–75%, and uniformly grafting a monomeric thermoplastic resin to a rigid starch under relatively severe conditions; the monomer used has a glass transition temperature of less than about 390 degrees F.;

B. about 0 to 95 parts(dry basis) of a starch containing material. The material includes 50-100 percent starch (dry basis) having any combination of amylose and amylopectin; and C. 0 to about 5 parts plasticizer.

The formulation may contain about 10 to about 30 percent moisture. Typically, the formulation contains less than about 15 percent moisture, and additional water, as liquid or steam, may be added prior to the direct expansion. The water acts as a "blowing agent", being superheated by compression of the extruder screw and subsequently released to atmospheric pressure.

In addition, small amounts of other additives such as nucleators, blowing agents, colorants, aromatic agents and the like may be incorporated in the formulation to achieve particular qualities desired in the products. Manipulable qualities include but are not limited to density, cell size, type of cell (open vs. closed), brittleness, resilience, water absorbance, compression strength, tensile strength, visual appearance and odor.

The expected products of the invention include a wide array of foamed articles, including loose fill packing, foam sheeting, rigid foam blocks, and miscellaneous thermoformed products such as egg containers, food trays, plates, and food containers. In addition, the formulation is useful for making floor sweeping compounds, and may be used for packaging hazardous waste materials which are to undergo a degradative treatment process.

DESCRIPTION OF THE PREFERRED EMBODIMENTS

In this invention, a starch-graft polymer is combined with a starch to form a composition which may be expanded into foam products ranging from rigid to resilient.

The type of starch-graft copolymer (SGC) especially useful in this invention is the type whose method of production is described in U.S. Pat. No. 4,026,849 of Bagley et al. In this starch-graft copolymer, a monomer is grafted to a starch under severe conditions to yield a high content of resin monomer, typically about 35-65 percent. The add-on resin is uniformly distributed through the bulk of the polysaccharide. The preferred monomer is methyl acrylate, although polystyrene, n-butyl acrylate, methyl methacrylate, acrylonitrile and/or other resins may alternatively be used. The SGC may be prepared using any starch or starch containing grain base. The materials of choice are unmodified or modified starches from corn, wheat, rice, potatoes, and/or tapioca. Secondary starch containing ingredients include flours of wheat, rice, and potatoes. Such flours contain measurable quantities of proteinaceous materials which tend to inhibit expansion of the foam. Other materials such as soybean starch or soybean flour may be used, but at lower levels. If used at high levels, i.e. above about 10 percent, the oil content of such materials reduces expansion and causes excessive slip in the extruder screw.

The ratio of starch containing material to monomer in the SGC is generally between 85:15 and 25:75. The ratio appears to have only a minor effect upon product quality, relative to the ratio of SGC to starch in the final product. Ratios on the order of 50:50 have been found very useful, and the preferred ratio is between 65:35 and 45:55.

Starch-graft copolymers particularly useful in the invention are those designated as Bio-Graft resins available from EverGreen Solutions, Inc., Bloomington, Minn.

The starch-graft copolymer (SGC) may be used in the expandable formulation at 5 to 100 percent of the total dry material. The higher levels of SGC generally result in greater expansion, softer and more resilient products, and more resistance to moisture. For loose fill packaging, the product needs to be formulated in the range of about 5 to about 20 percent SGC. For foam sheeting, the preferred level of SGC is from about 10 to about 50 percent. For high moisture applications requiring a high degree of water resistance, preferred levels of SGC are about 50 to 100 percent.

Additives such as plasticizers such as known in the art may be added to the formulation at low concentrations, up to about e.g. 5 percent, to soften the cell structure while enhancing either the strength or compressibility. Typical materials useful as plasticizers include glycerol, carboxymethylcellulose (CMC), and other plasticizing compounds known in the art.

The filler material(s) useful in the invention comprise starch containing materials having any combination of amylose and amylopectin, the total starch content comprising at least 40 percent of the filler. Very inexpensive, low-grade materials may be used to produce high quality foam products. The use of expensive high amylose starches may be avoided because of a reduced "amylose effect".

Other modifiers may advantageously be used in the formulation. Ingredients such as gums generally promote cell wall integrity. These gums may be cellulose derivatives such as CMC or microcrystalline cellulose, algin derivative gums such as guar gum or locust beam gum, and bio-gums such as xanthan gum. Polymer or copolymer materials may also be used as plasticizers to increase cell wall integrity.

Cell size may be controlled through the addition of blowing agents and/or nucleating agents. The former are materials e.g. azides, which decompose to gases in the hot extrusion process, or alternatively may comprise gases which are introduced just prior to final extrusion. Nucleating agents are small particle size materials which initiate the development of air cells and control the cell size. Typical nucleating agents are urea, trisodium phosphate, sodium stearate, silica and talc.

In one embodiment of the invention, the formulation is directly expanded by passage through a single-screw extruder and a die or dies to form the product. A twin-screw extruder is not required.

It has been found that the direct expansion of high amylose starches alone produces brittle, little expanded products. The addition of plasticizers such as polyvinyl alcohol has helped to produce a more compressible foam, but at higher cost than polystyrene foam. The bulk density of such materials is typically about 0.9-1.1 lb. per cubic foot.

By contrast, a foam product of the method of the invention is formed by direct expansion of the SGC-starch mixture, where the starch may be an inexpensive unmodified low-amylose material. The product has a typical bulk density in the range of 0.6-0.85 lb. per cubic foot and costs less than products made without SGC.

Products may be formed by the method of this invention with a wide range of humidity resistance. For example, a product may be made which resists moisture levels of up to 90+%, yet degrade upon exposure to continuous liquid water.

When this process is used to manufacture loose fill packing, for instance, a number of clear advantages are demonstrated.

First, a high amylose filler starch is not required in order to obtain satisfactory strength, elasticity, compression and water absorption properties. To the contrary, such properties are unexpectedly obtainable with a starch containing little or no amylose whatsoever.

Thus, cheaper filler materials with low amylose content and without expensive pretreatment may be used, reducing raw material costs by up to 50% or more. For example, a fine, small grain starch such as the low-cost "B" Wheat Starch produces a high quality loose fill packing with this process. Starch-containing materials with any combination of amylose and amylopectin may be used, and the starch material may contain other substances such as fatty or proteinaceous materials as well.

Second, unexpectedly low bulk density products are obtained. Thus, less material is needed per unit volume of packing, reducing both manufacturing and shipping costs. For "single-use" materials, the final disposal cost is also reduced.

Third, the materials produced by this process have been found to be less subject to moisture absorption than other starch-containing packing materials. The material properties are less affected by high and/or low relative humidity than other starch-containing packing materials. For example, packing materials which are stable at 90+ percent relative humidity have been prepared whose net resin content is less than 10 percent. Materials having a high resistance to moisture may be made from 100% SGC.

Fourth, the materials manufactured by this process have a high cohesiveness. Direct expansion at 1000 psi, for example results in a rigid or semirigid material with little tendency to crumble or dust.

Fifth, pretreating the starch-containing material at high temperatures to modify its structure is neither necessary nor desirable.

Sixth, the proportion of starch-graft copolymer (SGC) required to obtain good physical properties of the packing materials is much reduced from those used by others. Thus, for example, an excellent loose fill packing material may be obtained using SGC as 9% of the total dry ingredients. Thus, a composition using an SGC having 45 percent resin may contain only about 4 percent total resin. The cost of the final product is much reduced, and biodegradability is enhanced because of the high polysaccharide content.

Seventh, the properties of the final product may be readily manipulated through the use of additives, e.g. colorants, aroma agents, blowing agents, plasticizers, etc.

Eighth, a material may be formed which demonstrates a high degree of rapid physical degradability. Thus, for example, when the product is placed in liquid water, the material becomes non-cohesive very quickly and no longer is visibly recognizable as the original material. The wetted material is rapidly disintegrated, producing small wads of divisible material which are readily dispersed and incorporated into the biota of the soil for rapid biodegradation. The high starch content also leads to rapid biological destruction. Unlike solar sensitive polymeric materials, the degradation is not dependent upon exposure to solar radiation. Thus, the degradation is effective not only on the ground surface, but in covered landfills as well.

Moreover, because such articles degrade into a disintegrative amorphous mass rapidly when exposed to liquid water, they may be disposed of in sewerage systems and taken up by the life forms in wastewater treatment installations. Such materials provide a high dispersion of temporary attachment sites for activated sludge microbiota, enhancing the speed and degree of biodegradation.

Ninth, a simple, single-screw extruder may be used. Typically, twin-screw extruders are much more complex and cost two to four times as much as a single-screw machine.

A number of expandable foam formulations were evaluated for preparing loose packing materials, i.e. compressible "peanuts". The solid ingredients were introduced into a preconditioner cylinder of a production scale single-screw Extru-Tech cooking extruder Model No. E-525. The extruder had a 5.25 inch (13.3 cm) screw diameter and was operated at 386 rpm. The extruder had four zones (feed, metering, compression, and mixing) followed by a backup plate with a ⅜ inch diameter hole and four annular dies, each with a cross-sectional area of 0.025 square inches. Liquid water or steam was then added to supplement the moisture in the solid ingredients, and all ingredients mixed for about 45 seconds to 3.5 minutes, typically 2 minutes, while adjusting the temperature to about 130-210, typically 160-170 degrees F.

The material was then extruded through a multiple die extruder head at about 1000 psi and maximum head temperature of about 350 degrees F. to produce a foamed loose fill packing material. The water acted as a blowing agent. The feed rate was adjusted to provide an extrudate production rate of about 750 lbs. per hour. The material retention time in passage through the screw and dies was approximately 15 seconds. The extrudate streams were cut into 1 inch (2.5 cm.) segments by an automatic cutter.

EXAMPLE 1

A starch-graft copolymer (SGC) was obtained which had been manufactured in accordance with U.S. Pat. No. 4,026,849. This SGC was prepared by grafting a monomer methyl acrylate onto an unmodified basic corn starch (20% amylose) under relatively severe conditions and is designated as Bio-Graft Resin 010. The SGC was a 55:45 blend of starch and grafted methyl acrylate and the moisture content of the starch-graft copolymer was approximately 18-20 percent by weight.

The following formulation was prepared, wherein the quantities of solid materials such as SGC, starch, etc. are given on a wet basis, and the water percentage comprises water added to the other materials in the preconditioner as liquid or vapor(steam).

| | |
|---|---|
| Starch-graft copolymer (SGC) No. 010 | 18.0% |
| Unmodified Corn Starch (20% amylose) | 70.0% |
| Added Water | 12.0% |
| | 100.0% |

The total moisture content of the mixture was approximately 18%.

The ingredients were combined, mixed at elevated temperature and expanded through the extruder.

The extrudate was a mixture of open cell and closed cell material. The bulk density of the foamed product was determined to be 0.65 lb/cubic foot, by weighing the product filling a cubic foot container. The apparent tensile strength, elasticity, brittleness and lack of dusting (all as revealed by finger tests) indicated that the product was appropriate as foamed loose-fill packaging material similar to those popularly known as "foam peanuts". The low density and softness in a foamed product made from low amylose starch was unexpected.

EXAMPLE 2

The following formulation was prepared:

| Starch Graft Copolymer (SGC) No. 010 | 20.0% |
|---|---|
| Wheat Starch (unmodified A Type) | 55.0% |
| Corn Starch (70% amylose) | 15.0% |
| Added Water | 10.0% |
| | 100.0% |

Amylose comprised 21 percent of the total formulation.

The ingredients were combined, mixed and extruded to yield a foamed loose fill packaging material. The bulk density of the foamed product was determined to be 0.60 lb/cubic foot. When compared to the product from Example 1, this product was slightly lower in density, slightly softer and had a higher compressibility and strength. Presumably these differences were due to the higher amylose content. Like the material produced in Example 1, the product was considered appropriate as foamed loose-fill packaging material similar to those popularly known as "foam peanuts", based on subjective "finger manipulation" tests.

EXAMPLE 3

The following formulation was prepared:

| Starch Graft Copolymer (SGC) No. 010 | 24.0% |
|---|---|
| Wheat Starch (B Type, 19% amylose) | 45.0% |
| Corn Starch (50% amylose) | 20.0% |
| Added Water | 11.0% |
| Total | 100.0% |

Amylose comprised 19 percent of the total formulation.

The ingredients were combined, mixed and extruded to yield a foamed loose fill packaging material. The bulk density of the extremely light foamed product was determined to be 0.55 lb/cubic foot. When compared to the product from Example 1, this product had an apparent weaker structure making it less than optimal as a packing material.

EXAMPLE 4

The following formulation was prepared:

| Starch Graft Copolymer (SGC) No. 010 | 22.0% |
|---|---|
| Wheat Starch (B Type, 19% amylose) | 50.0% |
| Corn Starch (50% amylose) | 15.0% |
| Sodium Alginate (gum to strengthen cell wall) | 2.0% |
| Added Water (in preconditioning cylinder) | 11.0% |
| Total | 100.0% |

Amylose comprised 17 percent of the total formulation.

The ingredients were combined, mixed and extruded to yield a foamed loose fill packaging material. The bulk density of the foamed product was determined to be 0.70 lb/cubic foot. When compared to the product from Example 3, this product had a larger cell size but more cohesive structure. The addition of the gum sodium alginate to the formulation resulted in a stronger product. The product had acceptable resilience properties, far surpassing the qualities of a foam product prepared from starch without the starch-graft copolymer.

EXAMPLE 5

The following formulation was prepared:

| Starch Graft Copolymer (SGC) No. 010 | 22.0% |
|---|---|
| Wheat Starch (A Type, 19% amylose) | 40.0% |
| Corn Starch (acid modified, 19% amylose) | 28.0% |
| Carrageenan (gum to strengthen the cell wall) | 1.5% |
| Urea (nucleating agent) | 0.5% |
| Added Water (in preconditioning cylinder) | 8.0% |
| Total | 100.0% |

Amylose comprised 13 percent of the total formulation.

The ingredients were combined, mixed and extruded to yield a foamed loose fill packaging material. The bulk density of the foamed product was determined to be 0.70 lb/cubic foot. The product was improved over those of Examples 1–4 because of increased strength, smaller cell size, lack of brittleness, and high resilience.

EXAMPLE 6

The following formulation may be used for preparing a high quality loose fill packing material by extrusion through a cooking extruder:

| Starch Graft Copolymer (SGC) | 18.0% |
|---|---|
| Wheat Starch (A Type, 19% amylose) | 44.5% |
| Corn Stach (70% amylose) | 25.0% |
| Carboxymethyl cellulose | 2.0% |
| Talc (nucleating agent) | 0.5% |
| Added Water (in preconditioning cylinder) | 10.0% |
| Total | 100.0% |

Amylose comprises 26 percent of the total formulation.

The CMC is added to strengthen the cell wall structure, and the talc controls the cell size. Extrapolation from other tests indicates that a bulk density of about 0.7–0.75 is expected.

EXAMPLE 7

The following formulation is proposed for preparing a high quality foam sheet for use in packaging. Conventional equipment for making foam sheet materials may be used.

| Starch Graft Copolymer (SCG) | 28.0% |
|---|---|
| Wheat Starch (A Type, 19% amylose) | 19.0% |
| Corn Starch (acid modified, 19% amylose) | 10.0% |
| Corn Starch (50% amylose) | 15.0% |
| Potato Starch | 18.0% |
| Xanthan gum | 0.6% |
| Carrageenan | 0.9% |
| Urea | 0.3% |
| Added Water (in preconditioning cylinder) | 8.2% |
| Total | 100.0% |

Amylose comprises 17 percent of the total formulation.

This invention has been described in specific embodiments set forth in detail, particularly in the foregoing examples, but it should be understood that these examples and embodiment descriptions are by way of illustration only and that the invention is not necessarily limited thereto. Modifications and variations will be apparent from this disclosure and may be accomplished without departing from the spirit of the invention, as those skilled in the art readily understand. Accordingly, such variations and modifications of this disclosure are considered to be within the scope of this invention and the following claims.

What is claimed is:

1. A method for preparing a foamed material, comprising:

combining a starch-graft copolymer having at least 15% of a monomeric resin grafted to a first starch with a second starch to make a mixture, said starch graft copolymer having a glass transition temperature below about 390 degrees F;

adding liquid and/or vaporous water to bring the water content of the mixture to between 10 and 50 percent;

conditioning the wetted mixture at elevated temperature; and expanding the mixture.

2. The method of claim 1, wherein said first and second starch are unpredestructurized.

3. The method of claim 1, wherein said starch-graft copolymer comprises 36–65 percent add-on polymer.

4. The method of claim 1, wherein said second starch is derived from one or more of corn, wheat, rice, potatoes and tapioca.

5. The method of claim 1, wherein the starch-graft copolymer comprises a starch grafted with a methyl acrylate to produce a copolymer containing up to 65 percent add-on methyl acrylate.

6. The method of claim 1, wherein the mixture is expanded by passage through a single-screw extruder and die(s).

* * * * *

UNITED STATES PATENT AND TRADEMARK OFFICE
CERTIFICATE OF CORRECTION

PATENT NO. : 5,272,181
DATED : December 21, 1993
INVENTOR(S) : Boehmer et al.

It is certified that error appears in the above-indentified patent and that said Letters Patent is hereby corrected as shown below:

col 4, ln 34, delete "beam" and insert -- bean -- therefor.

IN THE CLAIMS claim 5, col 10, ln 14, insert -- polymer -- after the word "acrylate".

Signed and Sealed this

Fifth Day of July, 1994

Attest:

BRUCE LEHMAN

Attesting Officer    Commissioner of Patents and Trademarks